May 24, 1955  B. F. VALENTINE, SR  2,709,089
HITCH FOR COTTON CHOPPER

Filed July 18, 1951  2 Sheets-Sheet 1

Benjamin F. Valentine, Sr.
INVENTOR.

May 24, 1955
B. F. VALENTINE, SR
2,709,089
HITCH FOR COTTON CHOPPER
Filed July 18, 1951
2 Sheets-Sheet 2
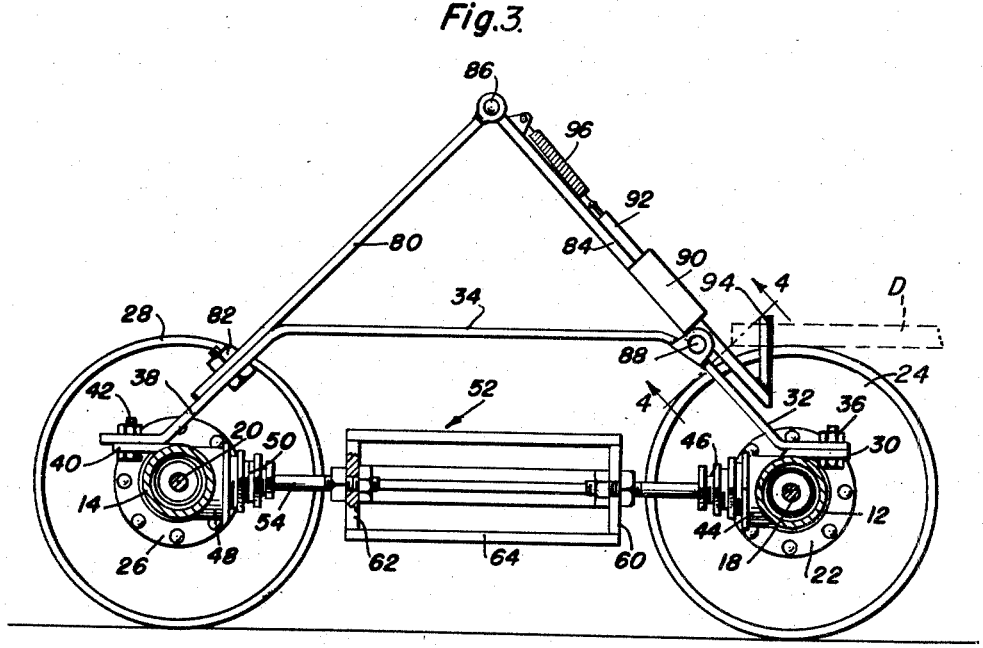
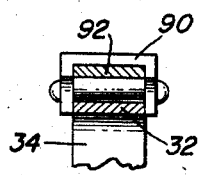
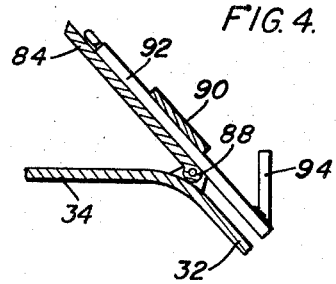
Benjamin F. Valentine, Sr.
INVENTOR.

United States Patent Office 2,709,089
Patented May 24, 1955

2,709,089

HITCH FOR COTTON CHOPPER

Benjamin F. Valentine, Sr., Wisner, La.

Application July 18, 1951, Serial No. 237,317

1 Claim. (Cl. 280—478)

This invention relates to new and useful improvements in choppers and the primary object of the present invention is to provide a small and compact wheeled support including a rotary chopper that will rotate as the support is moved over the ground to effectively cut cotton, beets or the like.

A further object of the present invention is to provide a cotton chopper including a novel and improved hitch means whereby the chopper may be quickly and readily attached to or removed from a towing vehicle, such as a tractor, in a convenient manner.

A still further aim of the present invention is to provide a chopper of the aforementioned character that is simple and practical in construction, strong and reliable in use, inexpensive to manufacture, service and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a vertical sectional view taken substantially on the plane of section line 3—3 of Figure 1;

Figure 4 is an enlarged detail sectional view taken substantially on the plane of section line 4—4 of Figure 3;

Figure 5 is an enlarged detail vertical sectional view taken substantially on the plane of section line 5—5 of Figure 1.

Figure 1:
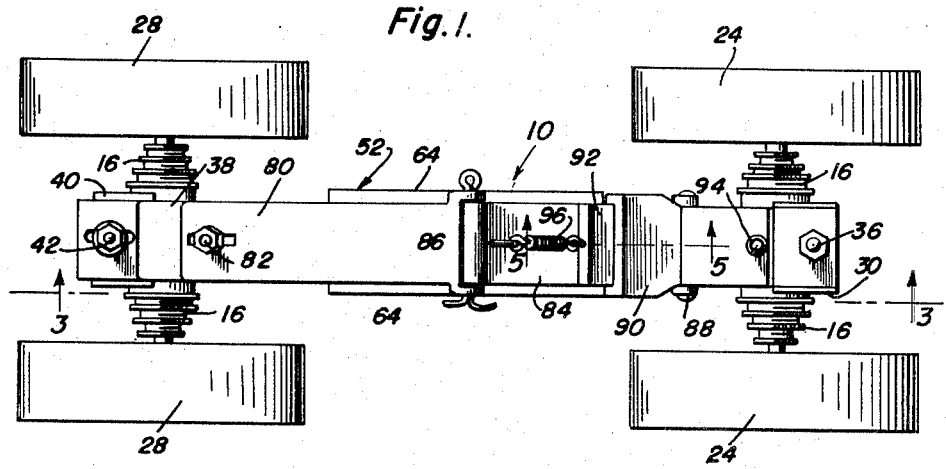
Figure 1 is a plan view of the present invention, the chopping elements removed from the rotor.
Figure 2:
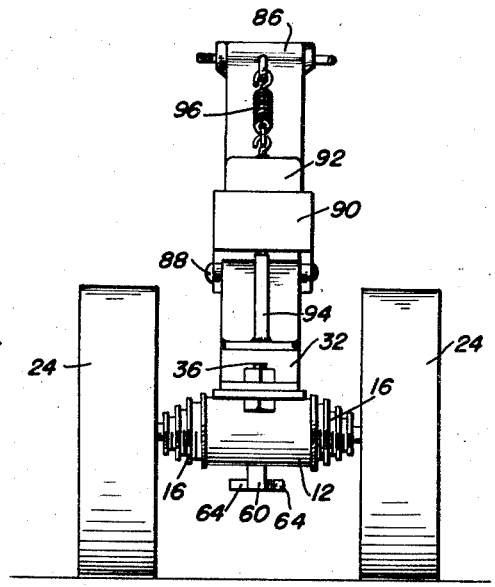
Figure 2 is an end view of Figure 1.

Referring now to the drawings in detail, wherein for the purpose of illustration, there is disclosed a preferred embodiment of the present invention, the numeral 10 represents a wheeled support composed of forward and rear-spaced parallel axle housings 12 and 14 whose ends carry packing glands 16 in which forward and rear axles 18 and 20 are rotatably supported.

The ends of the axle 18 project outwardly from the gland 16 of housing 12 and are fixed to mounting plates 22 secured to forward wheels 24. The ends of the axle 20 also project outwardly from the glands 16 of housing 12 and are likewise fixed to mounting plates 26 secured to rear wheels 28.

A forwardly extending ear 30 fixed by welding or the like is secured to the forward leg 32 of an inverted U-shaped brace 34 by a fastener 36, and the rear leg 38 of the brace 34 is removably secured to a rearwardly extending ear 40, fixed by welding or the like to housing 14, by a fastener 42.

The housing 12 is provided with a rearwardly extending hollow portion 44 that receives a packing gland 46 and the housing 14 is provided with a forwardly extending hollow portion 48 that receives a packing gland 50. A rotor 52 extends between the housing 12, 14 and includes a horizontal shaft 54 whose ends are journaled in the packing glands 46, 50.

Rotor 52 is composed of front and rear sets of radial arms 60 and 62 having outer ends to which bars 64 are terminally secured by suitable means. The bars 64 are arranged in pairs.

Means is provided for coupling the wheeled support 10 to a towing vehicle V. This means includes an upwardly and forwardly inclined rear bar member 80 whose lower end overlies the leg 38 and is formed with a slot accommodating a fastener 82 secured to leg 38. The upper end of an upwardly and rearwardly inclined front bar member 84 is hinged, as at 86, to the upper end of bar member 80 and the lower end of member 84 is pivoted, as at 88, to the leg 32 of brace 34.

A guide 90 is secured to the bar member 84 and slidably receives the shank 92 of a substantially vertical hitch pin 94. The upper end of shank 92 is connected to the upper end of the bar member 84 by a spring 96 that urges the pin 94 upwardly. The pin 94 is manually lowered and engaged in a drawbar D, whereupon spring 96 retains the pin engaged with the drawbar. Angularity of the pin 94 is accomplished by adjusting the bar member 80 on the leg 38 by fastener 82. Since the pin 94 is maintained in the same angular relationship with respect to member 84 as it is lowered or raised, it is quite apparent that pushing down on the shank 92 will immediately withdraw pin 94 from drawbar D. Further, once the pin 94 has been positioned in the aperture in the drawbar, release of the shank 92 will immediately cause engagement of the pin 94 with the drawbar.

Housings 14 may be replaced by steel framework supporting bearings that replace the packing glands. Such a construction will expose the gears for access thereto for lubricating purposes and the like.

Having thus described the invention, what is claimed as new is:

A cotton chopper comprising forward and rear spaced parallel axle housings having packing glands at their ends, axles rotatably supported by the housings and including ends extending through and outwardly from said packing glands, wheels on the ends of said axles, an inverted U-shaped brace having its ends secured to said housings, an upwardly and forwardly inclined rear bar member slidably adjustably secured at its lower end to the brace, an upwardly and rearwardly inclined front bar member hinged at its upper end to the upper end of the rear bar member and pivoted at its lower end to the brace, a guide carried by the front bar member, a vertical hitch pin having a shank slidably received in the guide, and a spring connecting the upper end of the front bar member to the shank of said pin and urging the pin toward the upper ends of the bar members.

References Cited in the file of this patent

UNITED STATES PATENTS

| | | |
|---|---|---|
| 490,782 | Beekman | Jan. 31, 1893 |
| 578,455 | Hopkins | Mar. 9, 1897 |
| 672,150 | Luhrs | Apr. 16, 1901 |
| 843,493 | Richardson | Feb. 5, 1907 |
| 1,235,843 | Rush | Aug. 7, 1917 |
| 1,435,752 | Stiffler et al. | Nov. 14, 1922 |
| 1,899,439 | Gratiot | Feb. 28, 1933 |
| 2,354,112 | Garst | July 18, 1944 |
| 2,389,790 | Leeper | Nov. 27, 1945 |
| 2,502,468 | Marihart | Apr. 4, 1950 |